(12) United States Patent
Nakamura et al.

(10) Patent No.: US 12,500,478 B2
(45) Date of Patent: Dec. 16, 2025

(54) ROTATOR

(71) Applicant: Mitsubishi Electric Corporation, Tokyo (JP)

(72) Inventors: Yuichiro Nakamura, Tokyo (JP); Atsushi Kinoshita, Tokyo (JP); Hideaki Arita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 268 days.

(21) Appl. No.: 18/269,953

(22) PCT Filed: Jan. 14, 2021

(86) PCT No.: PCT/JP2021/001049
§ 371 (c)(1),
(2) Date: Jun. 28, 2023

(87) PCT Pub. No.: WO2022/153438
PCT Pub. Date: Jul. 21, 2022

(65) Prior Publication Data
US 2023/0396126 A1 Dec. 7, 2023

(51) Int. Cl.
*H02K 7/102* (2006.01)
*H02K 7/116* (2006.01)

(52) U.S. Cl.
CPC ........... *H02K 7/1025* (2013.01); *H02K 7/116* (2013.01)

(58) Field of Classification Search
CPC .. H02K 7/1025; H02K 7/116; H02K 2201/12; H02K 1/2713; H02K 1/2746; H02K 21/048

USPC .......................................................... 310/77
See application file for complete search history.

(56) References Cited

U.S. PATENT DOCUMENTS

| 7,612,477 B2 | 11/2009 | Abe et al. |
| 7,944,102 B2 | 5/2011 | Eckert |

FOREIGN PATENT DOCUMENTS

| AT | 232125 B | 3/1964 | |
| DE | 102007035748 A1 * | 2/2009 | ........... F16D 63/006 |
| DE | 102010045447 B4 * | 2/2020 | ........... H02K 5/1732 |
| EP | 3599623 A1 * | 1/2020 | ............... E06B 9/72 |

(Continued)

OTHER PUBLICATIONS

EP3599623A1 English translation (Year: 2025).*

(Continued)

*Primary Examiner* — Christopher M Koehler
*Assistant Examiner* — Viswanathan Subramanian
(74) *Attorney, Agent, or Firm* — XSENSUS LLP

(57) ABSTRACT

A rotator includes: a motor; and a brake that brakes the motor. The brake includes: a rotating plate that rotates with rotation of a shaft; a slide plate provided such that the slide plate can be slid in an axial direction of an axis of rotation of the motor in such a way as to approach and move away from the rotating plate; a spring that biases the slide plate toward the rotating plate; and an electromagnet capable of attracting the slide plate in a direction away from the rotating plate. The electromagnet includes: a yoke including an inner cylinder and an outer cylinder; and a brake coil. The yoke is disposed between the slide plate and a rotor in the axial direction. The brake coil is disposed adjacent to the rotor. When the brake coil is energized, the slide plate approaches both the inner cylinder and the outer cylinder.

20 Claims, 12 Drawing Sheets

(56) References Cited

FOREIGN PATENT DOCUMENTS

| | | |
|---|---|---|
| JP | H10-42518 A | 2/1998 |
| JP | 2009-131148 A | 6/2009 |
| JP | 4845881 B2 | 12/2011 |
| WO | 2006/114881 A1 | 11/2006 |
| WO | 2015/092887 A1 | 6/2015 |
| WO | 2015/181900 A1 | 12/2015 |

OTHER PUBLICATIONS

DE102007035748A1 English translation (Year: 2025).*
WO2015181900A1 English translation (Year: 2025).*
WO2015092887A1 English translation (Year: 2025).*
DE102010045447B4 English translation (Year: 2025).*
International Search Report and Written Opinion mailed on Mar. 16, 2021, received for PCT Application PCT/JP2021/001049, filed on Jan. 14, 2021, 8 pages including English Translation.
Office Action issued Oct. 1, 2025 in German Patent Application No. 11 2021 006 808.3, 10 pages.

\* cited by examiner

ROTATOR

CROSS-REFERENCE TO RELATED APPLICATION

The present application is based on PCT filing PCT/JP2021/001049, filed Jan. 14, 2021, the entire contents of which is incorporated herein by reference.

FIELD

The present disclosure relates to a rotator including a motor and a brake.

BACKGROUND

Conventionally, there is known a rotator including a motor and a brake. In general, the motor and the brake are axially disposed along an axis of rotation of the motor. In a rotor having a non-excitation operation type, when a brake coil of the brake is energized, the braking of the motor is released to enable the motor to rotate.

For example, Patent Literature 1 discloses a rotor having a non-excitation operation type brake being disposed at one axial end portion of a motor with respect to an axis of rotation of the motor. The brake disclosed in Patent Literature 1 includes a side plate, a brake disc, and an armature. The side plate is provided such that the side plate is not movable in an axial direction of the axis of rotation of the motor, and is not rotatable. The brake disc is provided on an outer peripheral surface of a shaft such that the brake disc is movable in the axial direction of the axis of rotation of the motor, and rotates integrally with the shaft. The armature is provided such that the armature can be slid in the axial direction of the axis of rotation of the motor in such a way as to approach and move away from the brake disc. The armature, the brake disc, and the side plate are axially disposed in this order along the axis of rotation of the motor in a direction away from the motor.

Furthermore, the brake disclosed in Patent Literature 1 includes a yoke through which the shaft is passed. The yoke has a cylindrical shape, and is disposed between the motor and the armature. An annular recess and a spring recess are formed in the yoke. The annular recess is opened toward the armature. The spring recess is also opened toward the armature. A brake coil is placed in the annular recess, and a spring is placed in the spring recess. The spring biases the armature toward the brake disc.

In the rotator disclosed in Patent Literature 1, when the brake coil is energized, the armature is attracted to the yoke against the spring force of the spring, and moves away from the brake disc, so that the braking of the motor is released. Meanwhile, when energization of the brake coil is stopped, the armature moves toward the brake disc due to the spring force of the spring, and causes the brake disc to be sandwiched between the armature and the side plate, so that the motor is braked.

CITATION LIST

Patent Literature

Patent Literature 1: WO 2015/181900 A

SUMMARY OF INVENTION

Problem to be Solved by the Invention

However, in the technique disclosed in Patent Literature 1, the brake coil and the rotor are disposed on opposite sides of the yoke. Therefore, magnetic flux generated by the brake coil when the brake coil is energized is less likely to flow outside the brake through the yoke and the armature. In particular, in the technique disclosed in Patent Literature 1, the magnetic flux generated by the brake coil is less likely to flow to the rotor. This is because the thickness of a portion of the yoke located between the brake coil and the rotor is equal to the thickness of a cylindrical portion formed at a portion of the yoke facing the shaft. Therefore, the magnetic flux generated by the brake coil cannot be utilized for torque of the motor.

The present disclosure has been made in view of the above, and an object of the present disclosure is to provide a rotator capable of using magnetic flux generated by a brake coil for torque of a motor.

Means to Solve the Problem

In order to solve the above-described problem and achieve the object, a rotator according to the present disclosure includes: a motor including a stator, a rotor, and a shaft, the stator having a cylindrical shape, the rotor being provided on an inner peripheral side of the stator such that there is a gap between the rotor and the stator, the shaft being provided in such a way as to penetrate the rotor; and a brake that brakes the motor. The brake includes: a rotating plate that rotates with rotation of the shaft, the rotating plate being fixed on an outer peripheral surface of the shaft; a slide plate provided such that the slide plate can be slid in an axial direction of an axis of rotation of the motor in such a way as to approach and move away from the rotating plate; a spring that biases the slide plate toward the rotating plate by spring force; and an electromagnet disposed such that the electromagnet and the slide plate are located on opposite sides of the spring in the axial direction, the electromagnet being capable of attracting the slide plate in a direction away from the rotating plate against the spring force of the spring. The electromagnet includes: a yoke including an inner cylinder and an outer cylinder, the inner cylinder having a cylindrical shape, the shaft being passed through the inner cylinder, the outer cylinder having a cylindrical shape, the outer cylinder being disposed on an outer peripheral side of the inner cylinder such that there is a space between the inner cylinder and the outer cylinder; and a brake coil disposed in the space formed between the inner cylinder and the outer cylinder. The yoke is disposed between the slide plate and the rotor in the axial direction such that there is a gap between the yoke and each of the slide plate and the rotor. The brake coil is disposed adjacent to the rotor in the axial direction. When the brake coil is energized, the slide plate approaches both the inner cylinder and the outer cylinder.

Effects of the Invention

The rotator according to the present disclosure has the effect of enabling magnetic flux generated by the brake coil to be utilized for torque of the motor.

DESCRIPTION OF EMBODIMENTS

Hereinafter, rotators according to embodiments will be described in detail with reference to the drawings.

First Embodiment

Figure 1:
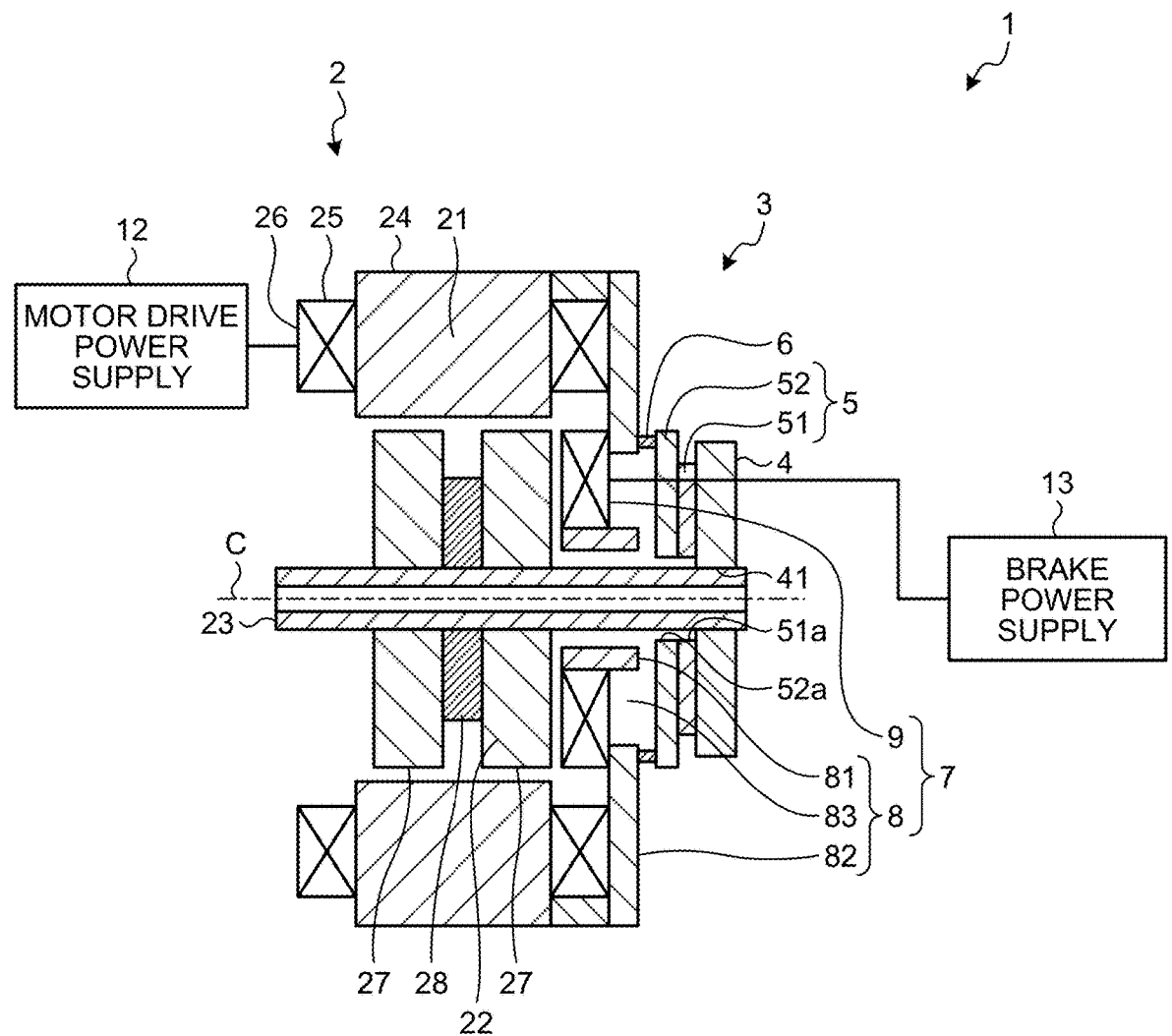
FIG. 1 is a cross-sectional view of a rotator according to a first embodiment in a state where a brake is working.

FIG. 1 is a cross-sectional view of a rotator 1 according to a first embodiment in a state where a brake is working. As illustrated in FIG. 1, the rotator 1 includes a motor 2 and a brake 3.

The motor 2 includes a stator 21, a rotor 22, and a shaft 23. The stator 21 is formed in a cylindrical shape having a central axis C. The stator 21, the rotor 22, and the shaft 23 are coaxially provided. The rotor 22 and the shaft 23 can rotate around the central axis C as an axis of rotation. Hereinafter, when a direction is described for each constituent element of the rotator 1, an axial direction of the axis of rotation of the rotor 22 and the shaft 23 is referred to as an "axial direction", a direction orthogonal to the axial direction of the axis of rotation of the rotor 22 and the shaft 23 is referred to as a "radial direction", and a direction of rotation centering on the axis of the rotor 22 and the shaft 23 is referred to as a "circumferential direction".

The stator 21 includes a stator core 24 and a motor coil 25. The stator core 24 has a cylindrical shape. The motor coil 25 is wound around the stator core 24. The stator core 24 is disposed in a proximity of an outer cylinder 82 to be described below. A coil end portion 26 of the motor coil 25 is disposed at each of axial end portions of the stator core 24. The coil end portion 26 is disposed in such a way as to overlap with a brake coil 9 to be described below in the radial direction.

The rotor 22 is provided on an inner peripheral side of the stator 21 such that there is a gap between the rotor 22 and the stator 21. The rotor 22 includes a plurality of rotor cores 27 and a permanent magnet 28. The rotor core 27 is formed in a cylindrical shape. The number of the rotor cores 27 is two in the first embodiment. The two rotor cores 27 are spaced apart from each other in the axial direction. The permanent magnet 28 is disposed between the adjacent rotor cores 27.

The shaft 23 is provided in such a way as to penetrate the center of the rotor 22 in the axial direction. The shaft 23 is passed through an inner peripheral side of each of the plurality of rotor cores 27. The shaft 23 is formed in a cylindrical shape. Both axial end portions of the shaft 23 protrude from the rotor cores 27. A load (not illustrated) is attached to one axial end portion of the shaft 23.

The brake 3 has a function of braking the motor 2. The motor 2 and the brake 3 are axially disposed. The brake 3 and the load are disposed on opposite sides of the motor 2. That is, the brake 3 is disposed on an anti-load side. The brake 3 includes a rotating plate 4, a slide plate 5, a spring 6, and an electromagnet 7. Note that the brake 3 may be disposed on a load side.

The rotating plate 4 is a disk-shaped member that is fixed on an outer peripheral surface of the shaft 23, and rotates with rotation of the shaft 23. An attachment hole 41 is formed in the center of the rotating plate 4. The shaft 23 is attached into the attachment hole 41.

The slide plate 5 is a member provided such that the slide plate 5 can be slid in the axial direction in such a way as to approach and move away from the rotating plate 4. In the first embodiment, the slide plate 5 includes a brake plate 51 and an armature 52. The brake plate 51 and the armature 52 are axially disposed in this order from the rotating plate 4 toward the motor 2. The brake plate 51 is a disk-shaped component. A through-hole 51a is formed in the center of the brake plate 51. The shaft 23 is passed through the through-hole 51a. A friction material (not illustrated) is provided on a surface of the brake plate 51 facing the rotating plate 4. The armature 52 is a disk-shaped component. A through-hole 52a is formed in the center of the armature 52. The shaft 23 is passed through the through-hole 52a. For example, soft magnetic material is used as a material of the armature 52. Examples of the soft magnetic material include a steel plate.

The spring 6 is a member that biases the slide plate 5 toward the rotating plate 4 by spring force. For example, a coil spring is used as the spring 6. When the brake works, the slide plate 5 is pressed against the rotating plate 4 by the spring force of the spring 6 to bring the friction material of the brake plate 51 into contact with the rotating plate 4, so that the motor 2 is braked. In a state where the brake is working, the slide plate 5 is pressed against the rotating plate 4 by the spring 6, so that a gap between the slide plate 5 and a yoke 8 increases. This reduces the amount of magnetic flux, generated by the permanent magnet 28, flowing to the yoke 8.

The electromagnet 7 is disposed such that the electromagnet 7 and the slide plate 5 are located on opposite sides of the spring 6 in the axial direction. The electromagnet 7 is a member capable of attracting the slide plate 5 in a direction away from the rotating plate 4 against the spring force of the spring 6. The electromagnet 7 includes the yoke 8 and the brake coil 9.

The yoke 8 includes: an inner cylinder 81 through which the shaft 23 passes; and an outer cylinder 82 provided on an outer peripheral side of the inner cylinder 81 such that there is a space 83 between the inner cylinder 81 and the outer cylinder 82. The inner cylinder 81 and the outer cylinder 82 are cylindrical in shape. The inner cylinder 81 and the outer cylinder 82 are concentrically formed. The space 83 is an annular space. The yoke 8 is disposed between the slide plate 5 and the rotor core 27 in the axial direction such that there is a gap between the yoke 8 and each of the slide plate 5 and the rotor core 27. The slide plate 5 is disposed on one side of the inner cylinder 81 in the axial direction. The rotor core 27 is disposed on another side of the inner cylinder 81 in the axial direction. The rotor core 27 is disposed in a proximity of the inner cylinder 81.

Figure 2:
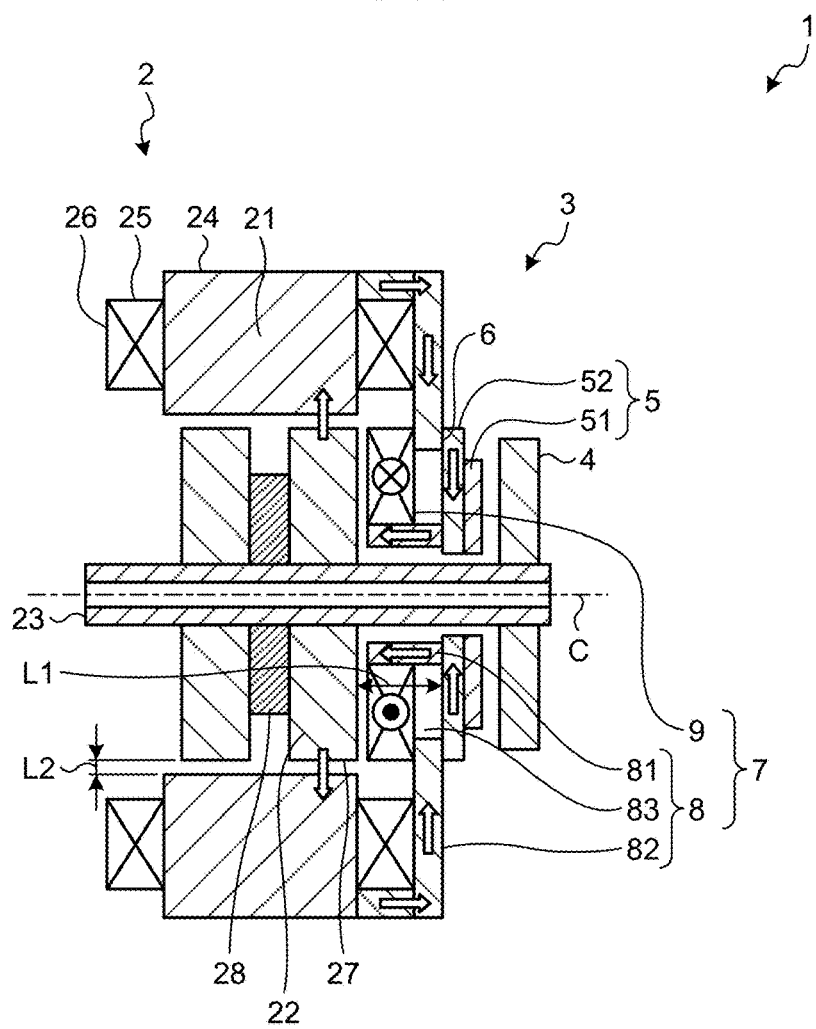
FIG. 2 is a cross-sectional view of the rotator according to the first embodiment in a state where the brake is released.

The brake coil 9 is disposed in the space 83 formed between the inner cylinder 81 and the outer cylinder 82. The brake coil 9 is disposed adjacent to the rotor core 27 in the axial direction. That is, the brake coil 9 is disposed adjacent to the rotor core 27 such that the yoke 8 is not interposed between the brake coil 9 and the rotor core 27 in the axial direction. FIG. 2 is a cross-sectional view of the rotator 1 according to the first embodiment in a state where the brake is released. As illustrated in FIG. 2, when the brake coil 9 is energized, the slide plate 5 is attracted in the direction away from the rotating plate 4 against the spring force of the spring 6, causing the slide plate 5 and the rotating plate 4 to be out of contact with each other. As a result, the braking of the motor 2 is released. When the brake coil 9 is energized, the slide plate 5 becomes adjacent to both the inner cylinder 81 and the outer cylinder 82. That is, when the brake coil 9 is energized, the slide plate 5 approaches both the inner cylinder 81 and the outer cylinder 82. In a state where the brake coil 9 is energized, an axial distance L1 from the rotor core 27 and the stator core 24 to the armature 52 is larger than a radial distance L2 from the rotor core 27 to the stator core 24. Hereinafter, magnetic flux to be generated by the brake coil 9 when the brake coil 9 is energized is referred to as brake magnetic flux. In FIG. 2, the flow of the brake magnetic flux is indicated by open arrows.

Next, effects to be brought about by the rotator 1 according to the first embodiment will be described.

As illustrated in FIG. 2, the brake magnetic flux generated by energization of the brake coil 9 flows through the inner cylinder 81 and then flows to the rotor core 27 disposed such that there is a slight gap between the inner cylinder 81 and the rotor core 27. Then, after flowing from the rotor core 27 to the stator core 24, the brake magnetic flux flows to the outer cylinder 82. Finally, after flowing from the outer cylinder 82 to the armature 52, the brake magnetic flux returns to the inner cylinder 81. As described above, the brake magnetic flux flows through the inner cylinder 81, the rotor core 27, the stator core 24, the outer cylinder 82, the armature 52, and the inner cylinder 81 in this order in such a way as to circulate. When the brake is released, the gap between the slide plate 5 and the yoke 8 decreases as a result of the slide plate 5 being attracted to the yoke 8 by energization of the brake coil 9. Therefore, the brake magnetic flux generated by the brake coil 9 is likely to flow toward the rotor core 27 rather than toward the slide plate 5.

Figure 3:
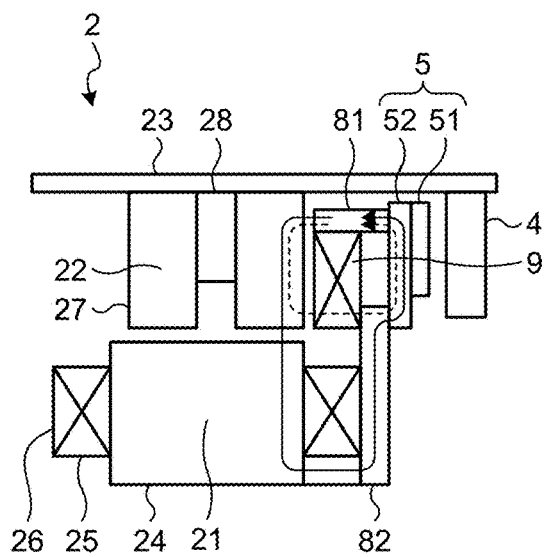
FIG. 3 is a partial cross-sectional view of the rotator according to the first embodiment in a state where the brake is released.

FIG. 3 is a partial cross-sectional view of the rotator 1 according to the first embodiment in a state where the brake is released. In FIG. 3, hatching is omitted for easy understanding. A path in which the brake magnetic flux flows through the inner cylinder 81, the rotor core 27, the stator core 24, the outer cylinder 82, the armature 52, and the inner cylinder 81 in this order, as indicated by a solid arrow in FIG. 3, allows the brake magnetic flux to contribute to improvement of the torque of the motor 2. Meanwhile, a path in which the brake magnetic flux flows through the inner cylinder 81, the rotor core 27, the brake coil 9, the outer cylinder 82, the armature 52, and the inner cylinder 81 in this order, as indicated by a dashed arrow in FIG. 3, does not allow the brake magnetic flux to contribute to improvement of the torque of the motor 2. In the first embodiment, the axial distance L1 from the rotor core 27 and the stator core 24 to the armature 52 is larger than the radial distance L2 from the rotor core 27 to the stator core 24 in a state where the brake coil 9 is energized, as illustrated in FIG. 2. Furthermore, in the first embodiment, since the brake coil 9 is disposed adjacent to the rotor core 27 in the axial direction, the magnetic resistance of a path in which the brake magnetic flux passes between the rotor core 27 and the stator core 24 is smaller than the magnetic resistance of a path in which the brake magnetic flux passes between the rotor core 27 and the brake coil 9. Therefore, a large part of the brake magnetic flux generated by the brake coil 9 and passing through the inner cylinder 81 flows from the rotor core 27 to the outer cylinder 82 through the stator core 24, resulting in a decrease in leakage flux passing through the brake coil 9 from the rotor core 27. That is, the brake magnetic flux generated by the brake coil 9 can be utilized for the torque of the motor 2. As a result, part of energization power of the brake coil 9 can be utilized as drive power for the motor 2. Therefore, when the rotator 1 according to the first embodiment is equal in size to a conventional rotator equipped with a brake, motor system efficiency can be improved. In addition, if the power consumption of the rotator 1 according to the first embodiment is equal to the power consumption of the conventional rotator equipped with the brake, the torque of the motor 2 can be improved. Furthermore, if the torque of the rotator 1 according to the first embodiment is equal to the torque of the conventional rotator equipped with the brake, the motor 2 can be reduced in size.

Second Embodiment

Figure 4:
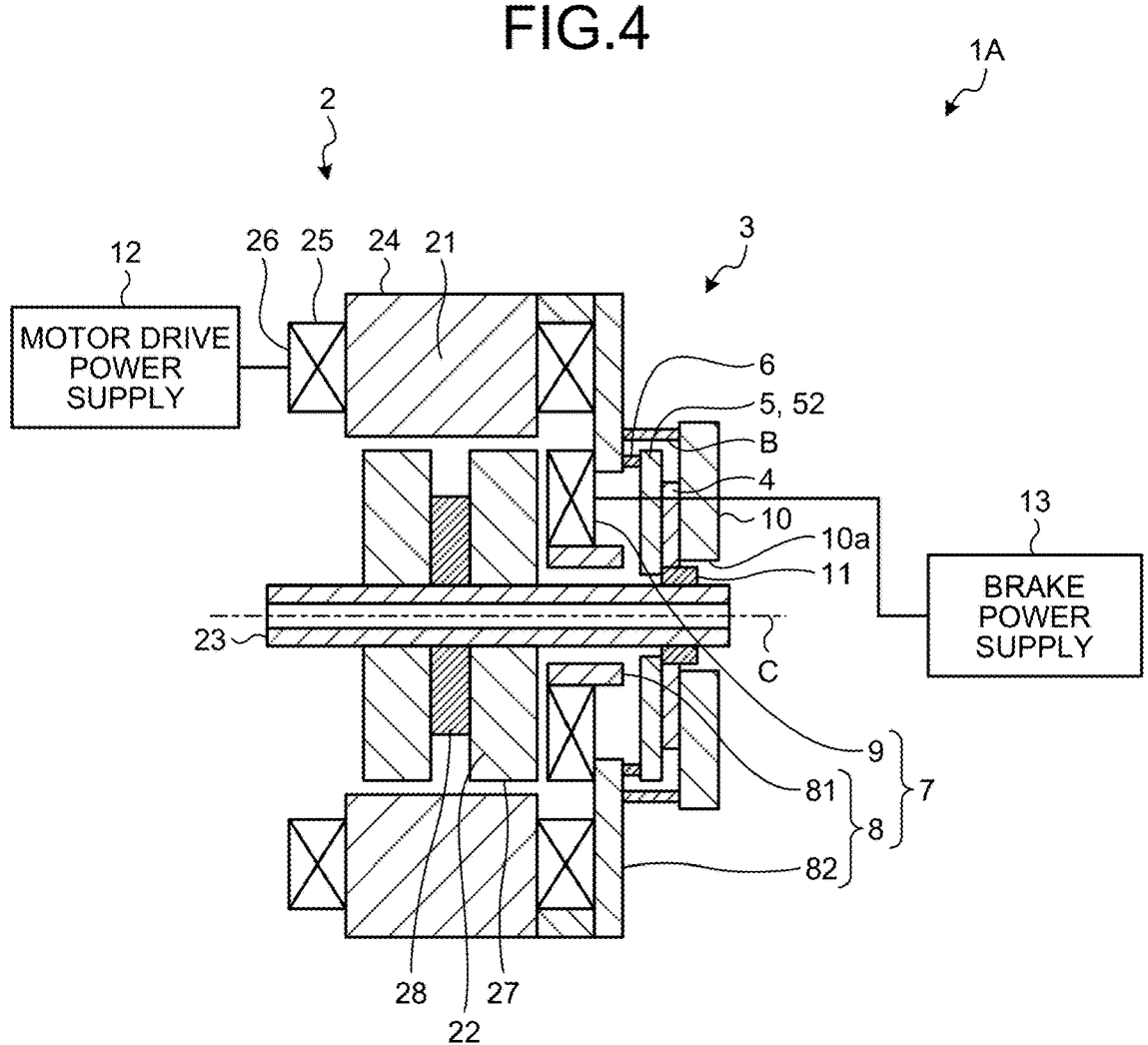
FIG. 4 is a cross-sectional view of a rotator according to a second embodiment in a state where the brake is working.

Next, a rotator 1A according to a second embodiment will be described with reference to FIG. 4. FIG. 4 is a cross-sectional view of the rotator 1A according to the second embodiment in a state where the brake is working. The second embodiment is different from the first embodiment described above in that the brake 3 includes a stationary plate 10. Note that, in the second embodiment, the same reference numerals are given to overlaps between the first embodiment described above and the second embodiment, and description thereof is omitted.

The stationary plate 10 is a disk-shaped member that is fixed to the outer cylinder 82 of the yoke 8 by bolts B such that the stationary plate 10 is neither movable nor rotatable. A through-hole 10a is formed in the center of the stationary plate 10. The shaft 23 is passed through the through-hole 10a.

The rotating plate 4 is coupled to the shaft 23 via a hub 11 fixed to the shaft 23. The rotating plate 4 is fitted in the hub 11 in such a way as to be rotatable with rotation of the shaft 23 and axially slidable. A friction material is provided on both surfaces of the rotating plate 4 in an axial direction.

In the second embodiment, the slide plate 5 is constituted by only the armature 52. The stationary plate 10, the rotating plate 4, and the slide plate 5 are axially disposed in this order toward the motor 2. The rotating plate 4 is disposed between the stationary plate 10 and the slide plate 5.

When the brake works, the slide plate 5 moves in the axial direction toward the rotating plate 4 due to the spring force of the spring 6. As a result, the rotating plate 4 is sandwiched between the slide plate 5 and the stationary plate 10. The respective friction materials provided on both surfaces of the rotating plate 4 in the axial direction come into contact with the slide plate 5 and the stationary plate 10, so that the motor 2 is braked.

In the second embodiment, both surfaces of the rotating plate 4 in the axial direction can be utilized for the braking of the motor 2, so that the rotating plate 4 and the slide plate 5 can be reduced in size.

Third Embodiment

Figure 5:
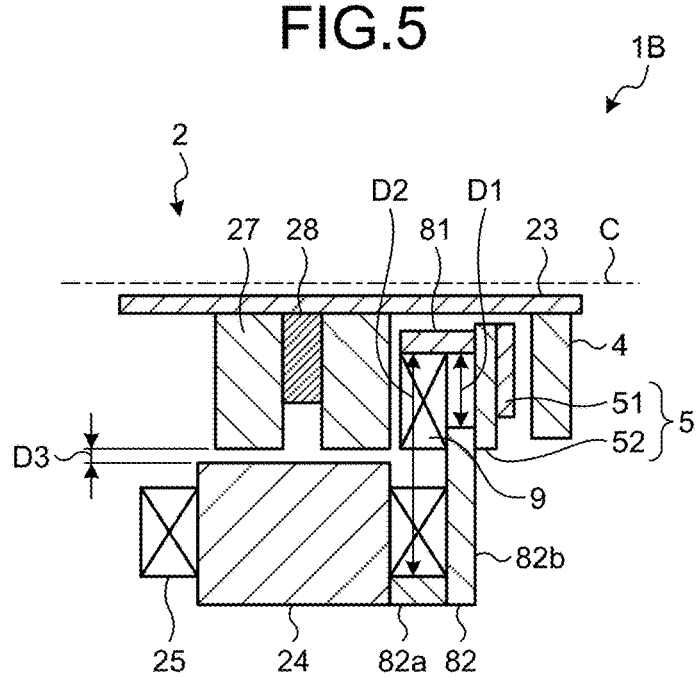
FIG. 5 is an enlarged cross-sectional view of a rotator according to a third embodiment in a state where the brake is released.

Next, a rotator 1B according to a third embodiment will be described with reference to FIG. 5. FIG. 5 is an enlarged cross-sectional view of the rotator 1B according to the third embodiment in a state where the brake is released. Note that, in the third embodiment, the same reference numerals are given to overlaps between the first embodiment described above and the third embodiment, and description thereof is omitted.

The outer cylinder 82 includes an outer cylinder main body 82a and a flange 82b. The outer cylinder main body 82a has a constant diameter in the axial direction. The flange 82b extends radially inward from an axial end portion of the outer cylinder main body 82a facing the slide plate 5, toward the inner cylinder 81.

Here, a first distance D1 is defined as a radial distance from an outer peripheral surface of the inner cylinder 81 to an inner peripheral surface of the flange 82b, which is a shortest radial distance between the inner cylinder 81 and the outer cylinder 82. A second distance D2 is defined as a radial distance from the outer peripheral surface of the inner cylinder 81 to an inner peripheral surface of the outer cylinder main body 82a, which is a longest radial distance between the inner cylinder 81 and the outer cylinder 82. A third distance D3 is defined as a radial distance from an inner peripheral surface of the stator core 24 to an outer peripheral surface of the rotor core 27. The first distance D1 and the second distance D2 are longer than the third distance D3.

In the second embodiment, since the first distance D1 and the second distance D2 are longer than the third distance D3, it is possible to suppress brake magnetic flux flowing directly from the inner cylinder 81 to the outer cylinder 82 not through the stator core 24. It is thus possible to reduce leakage flux that does not contribute to the torque of the motor 2.

Fourth Embodiment

Figure 6:
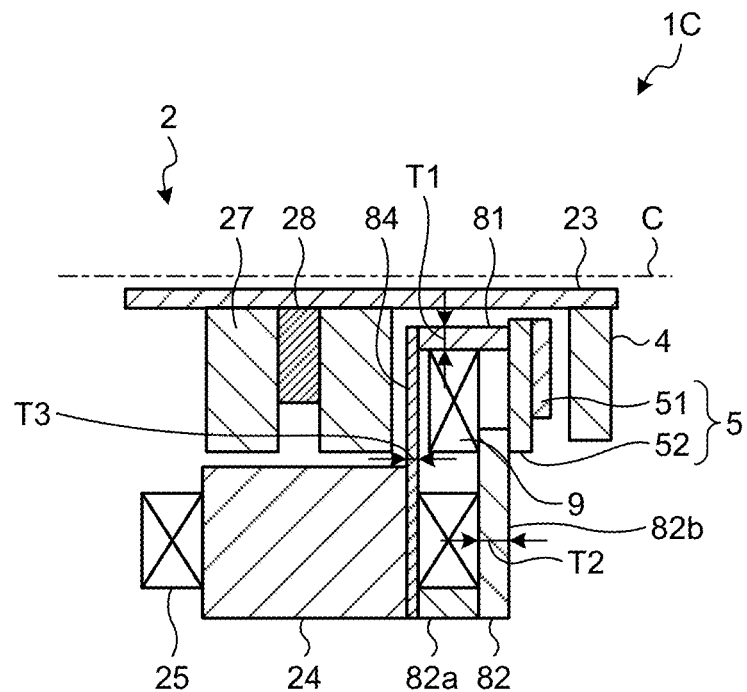
FIG. 6 is an enlarged cross-sectional view of a rotator according to a fourth embodiment in a state where the brake is released.

Next, a rotator 1C according to a fourth embodiment will be described with reference to FIG. 6. FIG. 6 is an enlarged cross-sectional view of the rotator 1C according to the fourth embodiment in a state where the brake is released. The fourth embodiment is different from the first embodiment described above in that the inner cylinder 81 and the outer cylinder 82 are integrated by a thin cylinder 84. Note that, in the fourth embodiment, the same reference numerals are given to overlaps between the first embodiment described above and the fourth embodiment, and description thereof is omitted.

The yoke 8 includes the thin cylinder 84 that connects the inner cylinder 81 and the outer cylinder 82. The thin cylinder 84 connects respective axial end portions of the inner cylinder 81 and the outer cylinder 82 facing the motor 2. The thin cylinder 84 is disposed between the inner cylinder 81 and the outer cylinder 82, and the motor 2. The thin cylinder 84 is disposed adjacent to the motor 2 in the axial direction.

A first thickness T1 is defined as the thickness of the inner cylinder 81, a second thickness T2 is defined as the thickness of the outer cylinder 82, and a third thickness T3 is defined as the thickness of the thin cylinder 84. The third thickness T3 is smaller than the first thickness T1 and the second thickness T2.

In the fourth embodiment, since the yoke 8 includes the thin cylinder 84 that connects the inner cylinder 81 and the outer cylinder 82, the inner cylinder 81 and the outer cylinder 82 are integrated via the thin cylinder 84, so that the number of parts can be reduced. As a result, it is possible to achieve cost reduction and improvement in ease of assembly. In the fourth embodiment, since the third thickness T3 of the thin cylinder 84 is smaller than the first thickness T1 of the inner cylinder 81 and the second thickness T2 of the outer cylinder 82, magnetic saturation occurs in brake magnetic flux at the thin cylinder 84, and the brake magnetic flux flows to the rotor core 27 and the stator core 24 through the thin cylinder 84. Thus, it is possible to reduce leakage flux that does not contribute to the torque of the motor 2.

Fifth Embodiment

Figure 7:
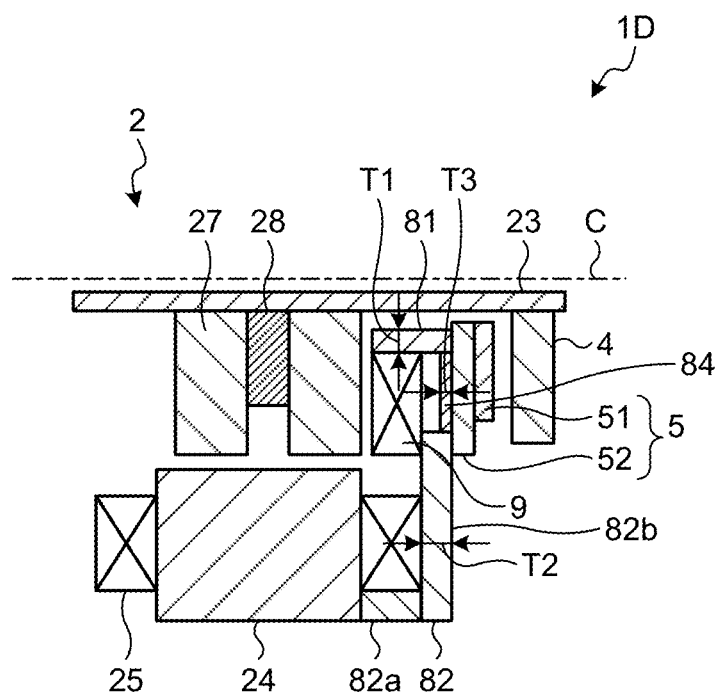
FIG. 7 is an enlarged cross-sectional view of a rotator according to a fifth embodiment in a state where the brake is released.

Next, a rotator 1D according to a fifth embodiment will be described with reference to FIG. 7. FIG. 7 is an enlarged cross-sectional view of the rotator 1D according to the fifth embodiment in a state where the brake is released. The fifth embodiment is different in the position of the thin cylinder 84 from the fourth embodiment described above. Note that, in the fifth embodiment, the same reference numerals are given to overlaps between the fourth embodiment described above and the fifth embodiment, and description thereof is omitted.

The thin cylinder 84 connects respective axial end portions of the inner cylinder 81 and the outer cylinder 82 facing the slide plate 5. The thin cylinder 84 extends in the radial direction between the inner cylinder 81 and the flange 82b. The thin cylinder 84 is disposed between the brake coil 9 and the slide plate 5 in the axial direction. The thin cylinder 84 is disposed adjacent to the armature 52 of the slide plate 5 in the axial direction. The third thickness T3 is smaller than the first thickness T1 and the second thickness T2.

In the fifth embodiment, the thin cylinder 84 that connects the inner cylinder 81 and the outer cylinder 82 is disposed adjacent to the armature 52. As a result, brake magnetic flux is more likely to flow from the inner cylinder 81 to the rotor core 27 and the stator core 24 than in a case where the thin cylinder 84 is disposed adjacent to the motor 2. Therefore, leakage flux that does not contribute to the torque of the motor 2 can be suppressed.

Sixth Embodiment

Figure 8:
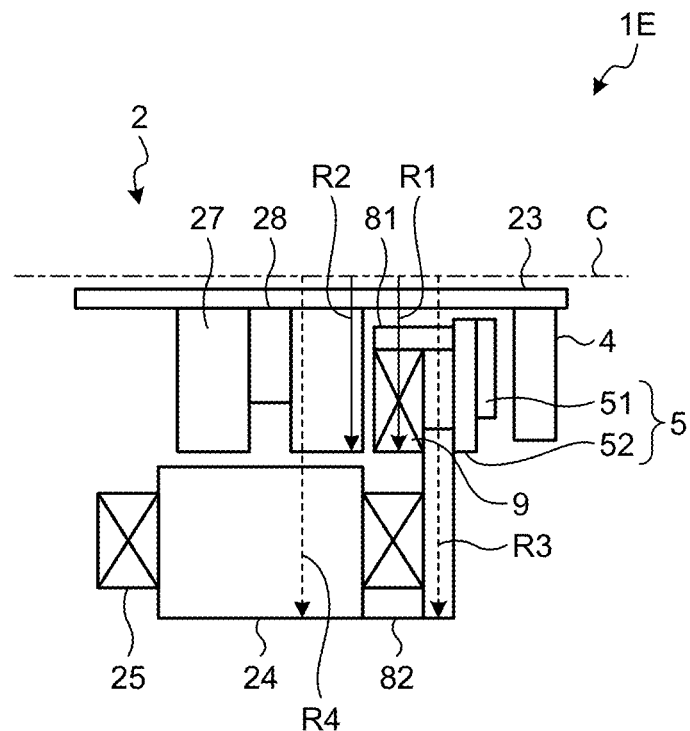
FIG. 8 is an enlarged cross-sectional view of a rotator according to a sixth embodiment in a state where the brake is released.

Next, a rotator 1E according to a sixth embodiment will be described with reference to FIG. 8. FIG. 8 is an enlarged cross-sectional view of the rotator 1E according to the sixth embodiment in a state where the brake is released. In FIG. 8, hatching is omitted for easy understanding. Note that, in the sixth embodiment, the same reference numerals are given to overlaps between the first embodiment described above and the sixth embodiment, and description thereof is omitted.

An outer diameter R1 of the brake coil 9 is equal to an outer diameter R2 of the rotor core 27. An outer diameter R3 of the outer cylinder 82 is equal to an outer diameter R4 of the stator core 24. In the present specification, cases where outer diameters are described as equal include not only a case where the outer diameters are completely equal but also a case where the outer diameters are slightly different due to a manufacturing error, an assembly error, or the like.

In the present embodiment, since the outer diameter R1 of the brake coil 9 is equal to the outer diameter R2 of the rotor core 27, it is possible to effectively cause brake magnetic flux to flow from the inner cylinder 81 to the rotor core 27 while suppressing an increase in the outer diameter of the brake coil 9. Furthermore, in the sixth embodiment, since the outer diameter R3 of the outer cylinder 82 is equal to the outer diameter R4 of the stator core 24, it is possible to effectively cause the brake magnetic flux to flow from the stator core 24 to the outer cylinder 82 while suppressing an increase in the outer diameter of the motor 2.

Seventh Embodiment

Figure 9:
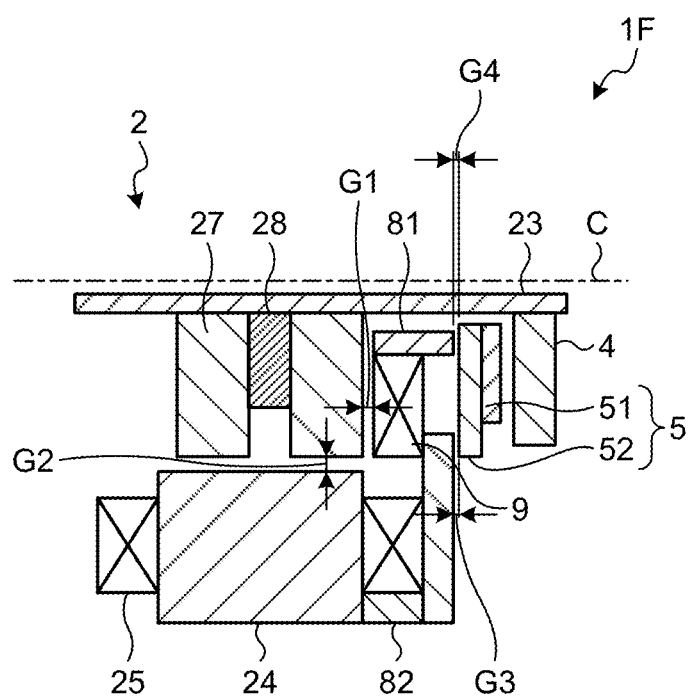
FIG. 9 is an enlarged cross-sectional view of a rotator according to a seventh embodiment in a state where the brake is released.

Next, a rotator 1F according to a seventh embodiment will be described with reference to FIG. 9. FIG. 9 is an enlarged cross-sectional view of the rotator 1F according to the seventh embodiment in a state where the brake is released. Note that, in the seventh embodiment, the same reference numerals are given to overlaps between the first embodiment described above and the seventh embodiment, and description thereof is omitted.

Here, a first gap G1 is defined as an axial gap formed between the inner cylinder 81 and the rotor core 27, and a second gap G2 is defined as a gap formed between the rotor core 27 and the stator core 24 in the radial direction. Furthermore, a third gap G3 is defined as an axial gap formed between the outer cylinder 82 and the slide plate 5, and a fourth gap G4 is defined as an axial gap formed between the inner cylinder 81 and the slide plate 5. The inner cylinder 81, the rotor core 27, the stator core 24, the outer cylinder 82, and the slide plate 5 are disposed such that in a state where the brake coil 9 is energized, the following relationships are satisfied: second gap G2>first gap G1>third gap G3≥0 mm, and second gap G2>first gap G1>fourth gap G4≥0 mm. When the brake works, the slide plate 5 moves away from the inner cylinder 81 and the outer cylinder 82 in the axial direction. Therefore, the third gap G3 and the fourth gap G4 are smaller in a state where the brake is released than in a state where the brake is working. The magnitude relationship between the third gap G3 and the fourth gap G4 is not particularly limited. Note that, in FIG. 9, the gaps G1, G2, G3, and G4 are extremely enlarged for easy understanding.

In the seventh present embodiment, in the state where the brake coil 9 is energized, the following relationships are satisfied: second gap G2>first gap G1>third gap G3>0 mm, and second gap G2>first gap G1>fourth gap G4>0 mm. As a result, it is possible to reduce leakage flux for brake magnetic flux flowing from the outer cylinder 82 to the slide plate 5, and also reduce leakage flux for brake magnetic flux flowing from the slide plate 5 to the inner cylinder 81. Therefore, the brake magnetic flux can be further utilized for the torque of the motor 2. In addition, since the second gap G2 is larger than the first gap G1, an increase in cogging torque can be suppressed in the seventh present embodiment.

Eighth Embodiment

Figure 10:
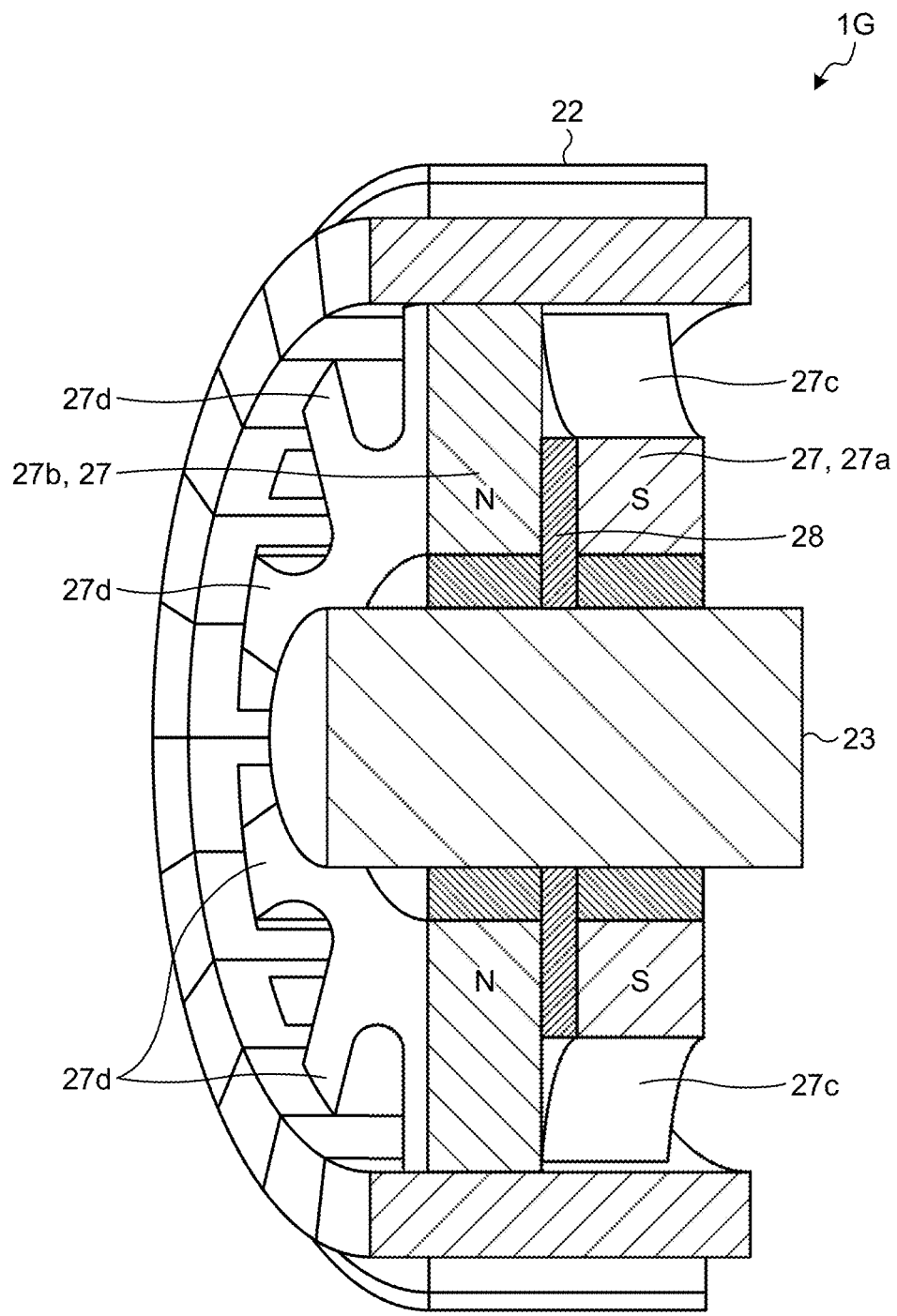
FIG. 10 is a cross-sectional perspective view of a rotor of a rotator according to an eighth embodiment.

Next, a rotator 1G according to an eighth embodiment will be described with reference to FIG. 10. FIG. 10 is a cross-sectional perspective view of the rotor 22 of the rotator 1G according to the eighth embodiment. Note that, in the eighth embodiment, the same reference numerals are given to overlaps between the first embodiment described above and the eighth embodiment, and description thereof is omitted.

The rotor 22 is a rotor of a claw-pole type. The rotor 22 includes the rotor core 27 and the permanent magnet 28. The rotor core 27 is formed of a plurality of magnetic steel sheets layered in the axial direction. In the eighth embodiment, two magnetic steel sheets are illustrated in the drawing, but this is not intended to limit the number of magnetic steel sheets. Hereinafter, when the two magnetic steel sheets are distinguished, one of the magnetic steel sheets is referred to as a first rotor core 27a, and the other magnetic steel sheet is referred to as a second rotor core 27b. The permanent magnet 28 magnetized in the axial direction is disposed between the first rotor core 27a and the second rotor core 27b adjacent to each other.

A plurality of protrusions 27c are provided on an outer peripheral surface of the first rotor core 27a at regular angular intervals in the circumferential direction. A plurality of protrusions 27d are provided on an outer peripheral surface of the second rotor core 27b at regular angular intervals in the circumferential direction. The protrusions 27c and the protrusions 27d are staggered in the circumferential direction. That is, when the rotor core 27 is viewed in the axial direction, the protrusions 27c and the protrusions 27d are alternately disposed in the circumferential direction.

In the eighth embodiment, the protrusions 27c of the first rotor core 27a and the protrusions 27d of the second rotor core 27b are alternately disposed in the circumferential direction. Therefore, although not illustrated in the drawing here, brake magnetic flux can smoothly flow through the inner cylinder 81, the first rotor core 27a, the stator core 24, and the outer cylinder 82 in this order. As a result, the torque of the motor 2 can be improved.

Note that an integrated part made of soft magnetic material may be used as the rotor core 27. This enables the rotor core 27 to be easily produced in a triangular shape in which only a surface of the rotor core 27 facing the stator core 24 is extended in the radial direction. Furthermore, the permanent magnet 28 may be omitted. Alternatively, a direct-current excitation coil may be placed instead of the permanent magnet 28. Since the permanent magnet 28 is not used for the rotor 22, it is possible to produce the motor 2 more inexpensively, and also to improve the strength of the rotor 22 to increase the speed of rotation of the rotor 22.

Ninth Embodiment

Figure 11:
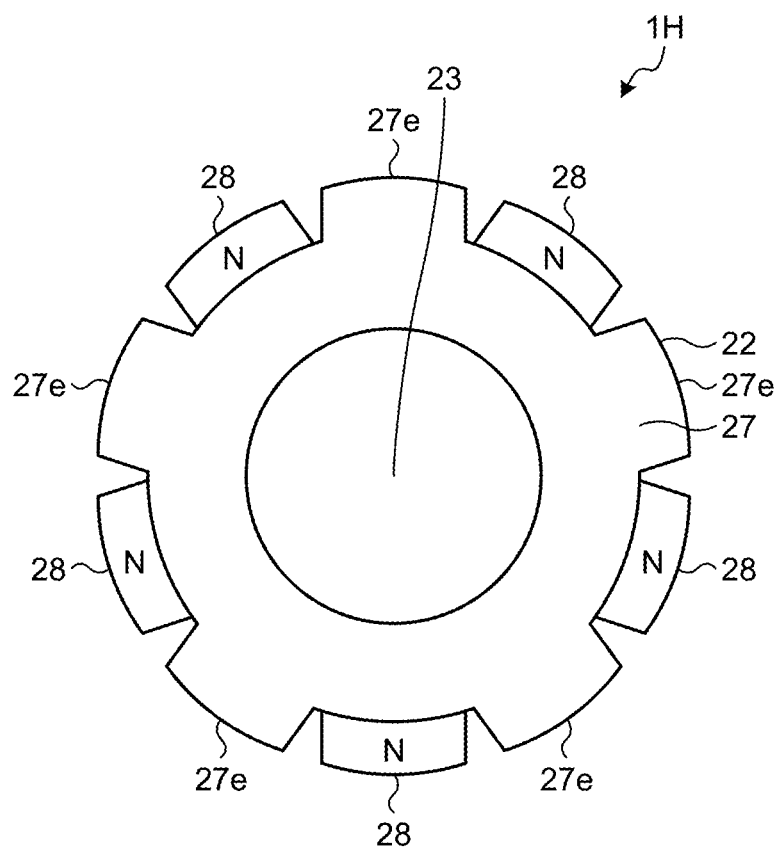
FIG. 11 is a diagram illustrating a rotor of a rotator according to a ninth embodiment.

Next, a rotator 1H according to a ninth embodiment will be described with reference to FIG. 11. FIG. 11 is a diagram illustrating the rotor 22 of the rotator 1H according to the ninth embodiment. Note that, in the ninth embodiment, the same reference numerals are given to overlaps between the eighth embodiment described above and the ninth embodiment, and description thereof is omitted.

The rotor 22 is a rotor of a consequent-pole type. The rotor 22 includes the rotor core 27 and the permanent magnet 28. Protrusions 27e and the permanent magnets 28 magnetized in a single direction are alternately disposed in the circumferential direction on the outer peripheral surface of the rotor core 27. In this way, although not illustrated in the drawing here, brake magnetic flux can smoothly flow through the inner cylinder 81, the rotor core 27, the stator core 24, and the outer cylinder 82 in this order, so that the torque of the motor 2 can be improved.

Tenth Embodiment

Figure 12:
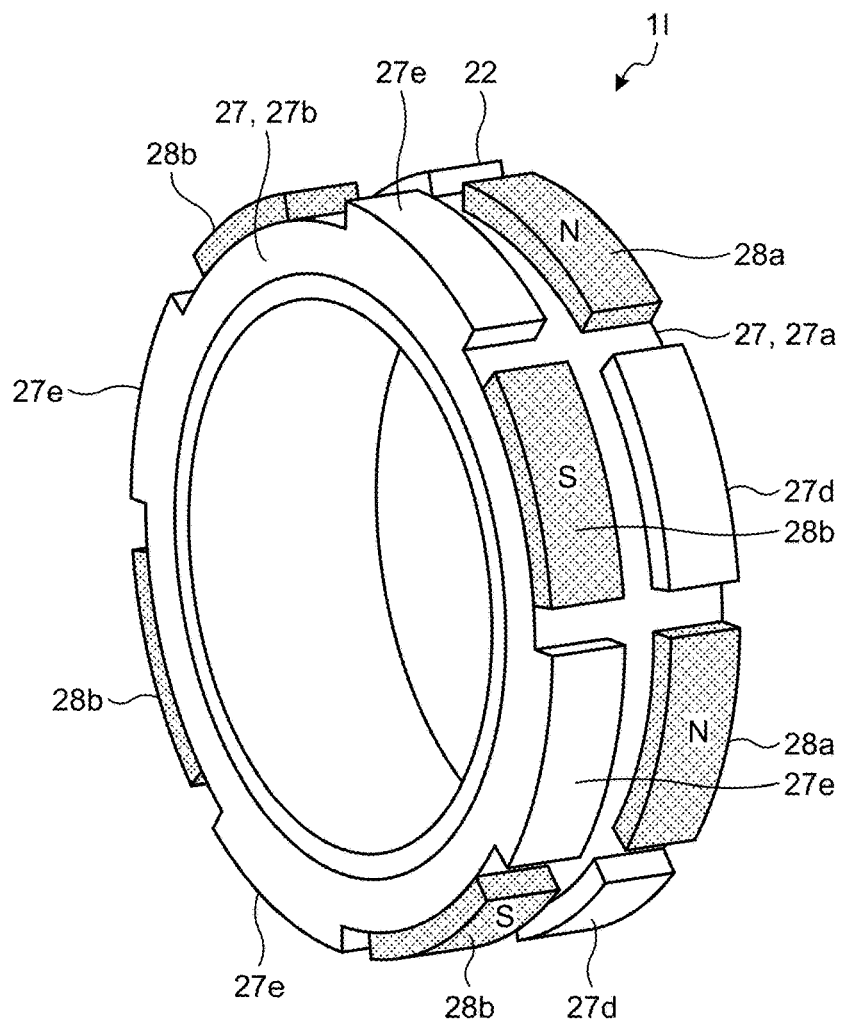
FIG. 12 is a perspective view of a rotor of a rotator according to a tenth embodiment.

Next, a rotator 1I according to a tenth embodiment will be described with reference to FIG. 12. FIG. 12 is a perspective view of the rotor 22 of the rotator 1I according to the tenth embodiment. Note that, in the tenth embodiment, the same reference numerals are given to overlaps between the eighth embodiment described above and the tenth embodiment, and description thereof is omitted.

The rotor 22 is a rotor of a mixed type of the claw-pole type and the consequent-pole type. The rotor 22 includes the rotor core 27 and the permanent magnet 28. The protrusions 27d and permanent magnets 28a magnetized in a single direction are alternately disposed in the circumferential direction on the outer peripheral surface of the first rotor core 27a. The protrusions 27e and permanent magnets 28b magnetized in a single direction are alternately disposed in the circumferential direction on the outer peripheral surface of the second rotor core 27b. The first rotor core 27a and the second rotor core 27b are disposed such that the protrusions 27d of the first rotor core 27a and the permanent magnets 28b of the second rotor core 27b overlap each other in the axial direction, and such that the permanent magnets 28a of the first rotor core 27a and the protrusions 27e of the second rotor core 27b overlap each other in the axial direction. The direction of magnetization of the permanent magnets 28a is opposite to the direction of magnetization of the permanent magnets 28b.

In the tenth embodiment, the first rotor core 27a and the second rotor core 27b are disposed such that the protrusions 27d of the first rotor core 27a and the permanent magnets 28b of the second rotor core 27b overlap each other in the axial direction, and such that the permanent magnets 28a of the first rotor core 27a and the protrusions 27e of the second rotor core 27b overlap each other in the axial direction. As a result, since the shaft 23 (not illustrated) can be prevented from being magnetized in the axial direction, a soft magnetic material can be easily disposed at an axial end portion of the shaft 23.

Eleventh Embodiment

Figure 13:
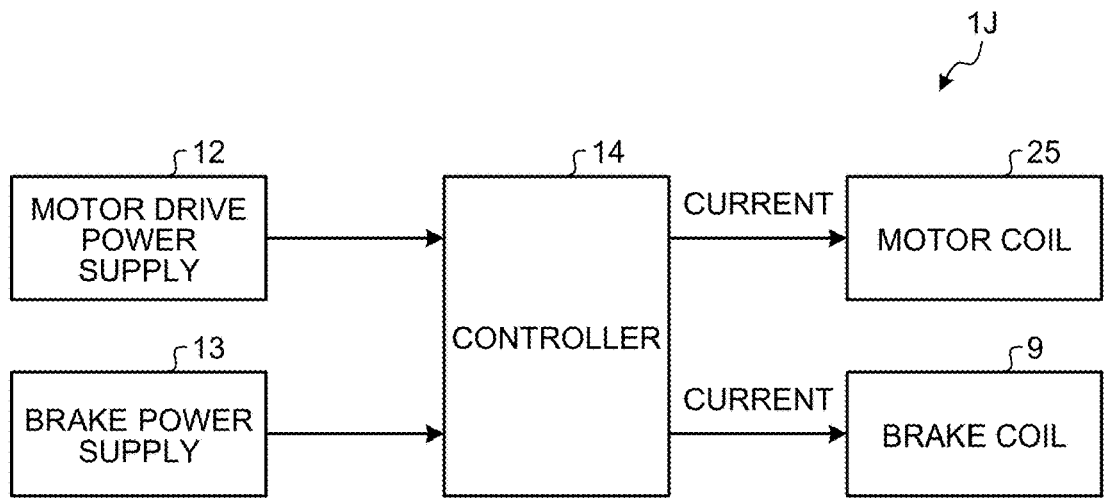
FIG. 13 is a control block diagram of a rotator according to an eleventh embodiment.

Next, a rotator 1J according to an eleventh embodiment will be described with reference to FIG. 13. FIG. 13 is a control block diagram of the rotator 1J according to the eleventh embodiment. Note that, in the eleventh embodiment, the same reference numerals are given to overlaps between the first embodiment described above and the eleventh embodiment, and description thereof is omitted.

The rotator 1J includes a motor drive power supply 12, a brake power supply 13, a controller 14, the motor coil 25, and the brake coil 9.

The motor drive power supply 12 is an external power supply that supplies power to the motor coil 25. The brake power supply 13 is an external power supply that supplies power to the brake coil 9.

The controller 14 is electrically connected to the motor drive power supply 12, the brake power supply 13, the motor coil 25, and the brake coil 9. A control circuit of the motor coil 25 and a control circuit of the brake coil 9 are integrated in the controller 14.

In the eleventh embodiment, since the rotator 1J includes the controller 14 in which the control circuit of the motor coil 25 and the control circuit of the brake coil 9 are integrated, the control circuit for driving and the control circuit for braking can be shared. Therefore, it is possible to increase the efficiency of the rotator 1J by optimally distributing current to the motor coil 25 and the brake coil 9 while downsizing the rotator 1J. For example, when the speed of rotation of the motor 2 is slow, the brake coil 9 is energized in a direction for strengthening magnetic flux of the rotor 22, and when the speed of rotation of the motor 2 is fast, the brake coil 9 is energized in a direction for weakening the magnetic flux of the rotor 22 so as to reduce the terminal voltage of the motor 2. As a result, the efficiency of the rotator 1J can be increased.

Twelfth Embodiment

Figure 14:
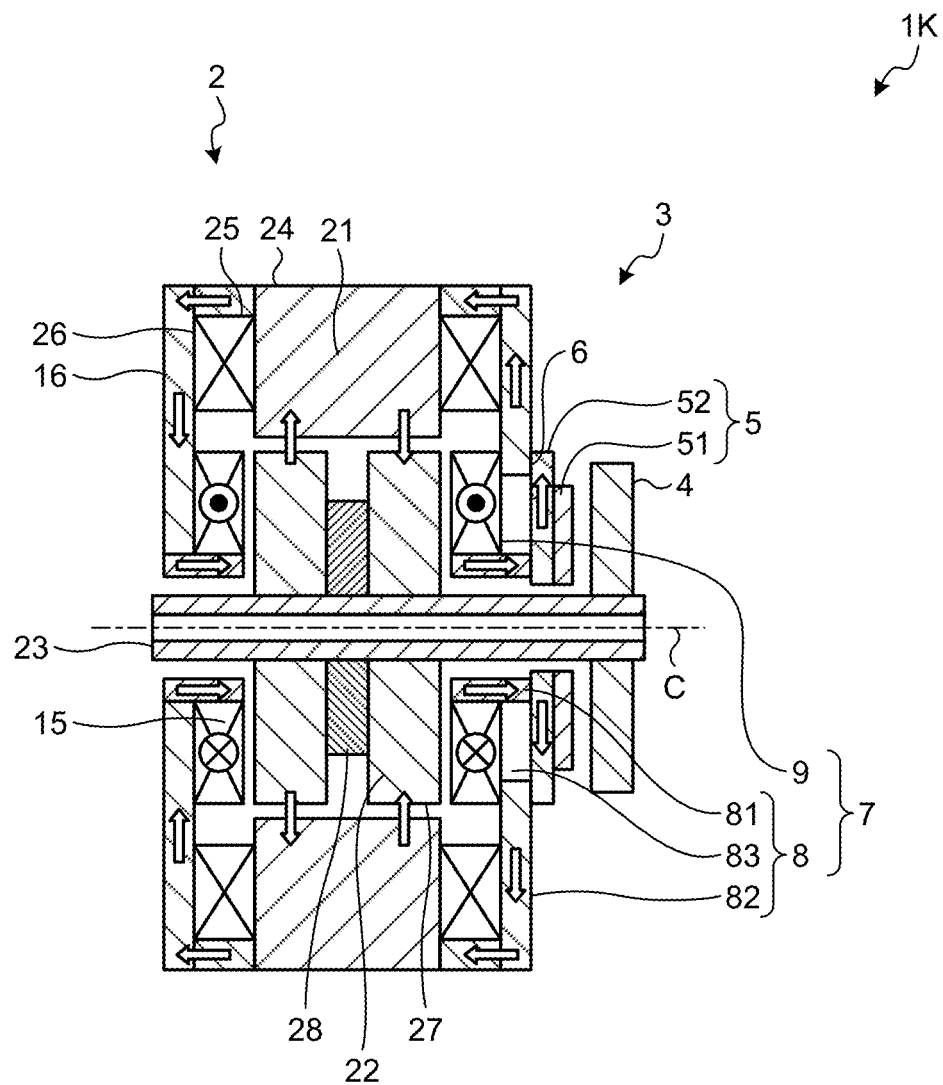
FIG. 14 is a cross-sectional view of a rotator according to a twelfth embodiment in a state where the brake is released.

Next, a rotator 1K according to a twelfth embodiment will be described with reference to FIG. 14. FIG. 14 is a cross-sectional view of the rotator 1K according to the twelfth embodiment in a state where the brake is released. Note that, in the twelfth embodiment, the same reference numerals are given to overlaps between the first embodiment described above and the twelfth embodiment, and description thereof is omitted.

The eleventh embodiment assumes that the rotor 22 according to the eighth embodiment is used. The rotator 1K includes an excitation coil 15 and an excitation yoke 16. The excitation coil 15 is disposed such that the excitation coil 15 and the brake coil 9 are located on opposite sides of the motor 2 in the axial direction. The excitation yoke 16 has a cylindrical shape, and accommodates the excitation coil 15. The direction of energization of the brake coil 9 is opposite to the direction of energization of the brake coil 9 in the first embodiment. The direction of energization of the brake coil 9 is identical to the direction of energization of the excitation coil 15. Hereinafter, magnetic flux to be generated by energization of the excitation coil 15 is referred to as excitation magnetic flux.

In the twelfth embodiment, brake magnetic flux flows through the inner cylinder 81, the armature 52, the outer cylinder 82, the stator core 24, and the rotor core 27 in this order, and then returns to the inner cylinder 81. Meanwhile, the excitation magnetic flux flows through the excitation yoke 16, the rotor core 27, the stator core 24, and the excitation yoke 16 in this order.

In the twelfth embodiment, the rotator 1K includes the excitation coil 15 disposed such that the excitation coil 15 and the brake coil 9 are located on the opposite sides of the motor 2 in the axial direction. As a result, the excitation magnetic flux generated by the excitation coil 15 can be utilized for the torque of the motor 2. Thus, as compared with the case of using only the brake magnetic flux generated by the brake coil 9, it is possible to cause magnetic flux to flow in a well-balanced manner on both sides of the motor 2 in the axial direction. Therefore, it is possible to reduce the electromagnetic force of the motor 2 in the axial direction. Furthermore, in the twelfth embodiment, the rotor 22 is a rotor of the claw-pole type, and the direction of energization of the brake coil 9 is identical to the direction of energization of the excitation coil 15, so that it is possible to reduce leakage flux that does not link with the motor coil 25.

Note that, in the twelfth embodiment, the rotor 22 according to the eighth embodiment has been used as an example, but the same effect can be obtained even when the rotor 22 of the tenth embodiment is used. That is, it is possible to reduce the electromagnetic force of the motor 2 in the axial direction. In addition, since the rotor 22 is of a mixed type of the claw-pole type and the consequent-pole type, and the direction of energization of the brake coil 9 is identical to the direction of energization of the excitation coil 15, it is possible to reduce the leakage flux that does not link with the motor coil 25.

Thirteenth Embodiment

Figure 15:
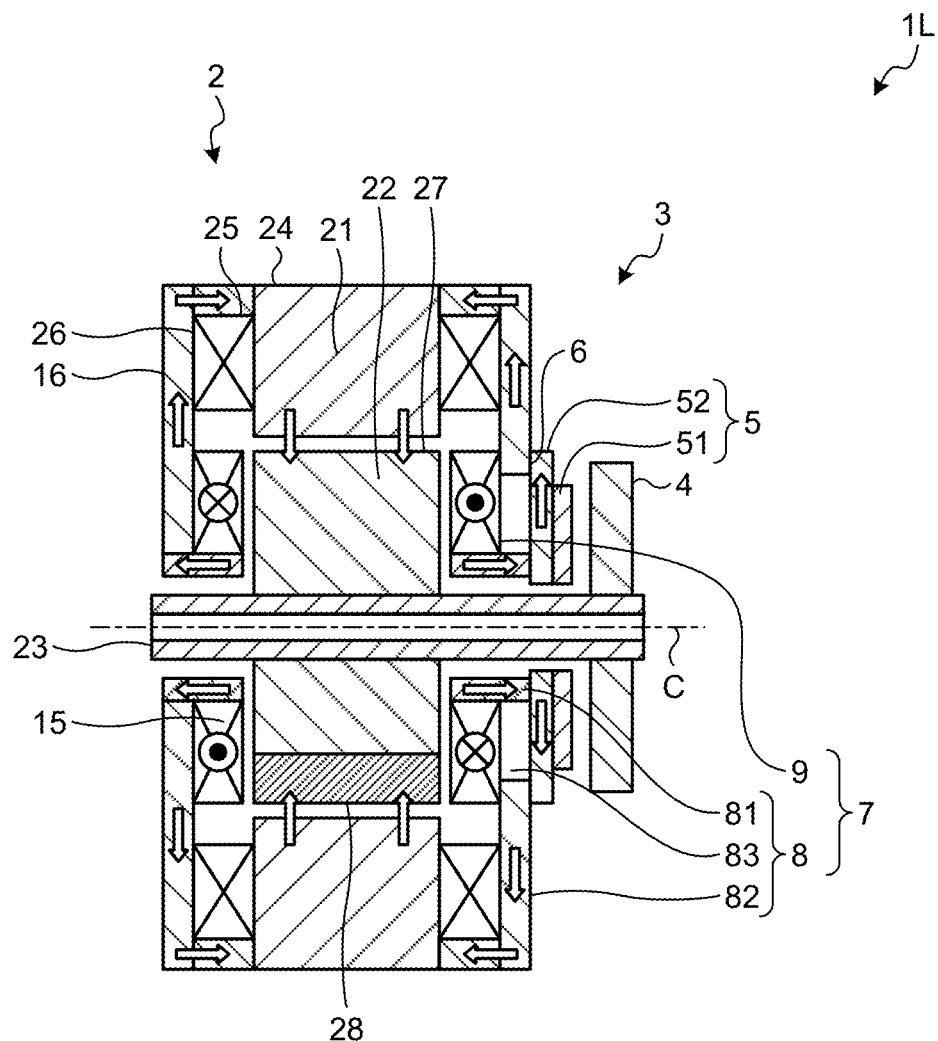
FIG. 15 is a cross-sectional view of a rotator according to a thirteenth embodiment in a state where the brake is released.

Next, a rotator 1L according to a thirteenth embodiment will be described with reference to FIG. 15. FIG. 15 is a cross-sectional view of the rotator 1L according to the thirteenth embodiment in a state where the brake is released. Note that, in the thirteenth embodiment, the same reference numerals are given to overlaps between the twelfth embodiment described above and the thirteenth embodiment, and description thereof is omitted.

The thirteenth embodiment assumes that the rotor 22 according to the ninth embodiment is used. The direction of energization of the brake coil 9 is identical to the direction of energization of the brake coil 9 in the twelfth embodiment. The direction of energization of the brake coil 9 is opposite to the direction of energization of the excitation coil 15.

In the thirteenth embodiment, brake magnetic flux flows through the inner cylinder 81, the armature 52, the outer cylinder 82, the stator core 24, and the rotor core 27 in this order, and then returns to the inner cylinder 81. Meanwhile, excitation magnetic flux flows through the excitation yoke 16, the stator core 24, the rotor core 27, and the excitation yoke 16 in this order.

In a case where the rotor 22 of the ninth embodiment is used, it is possible to reduce the electromagnetic force of the motor 2 in the axial direction, as in the twelfth embodiment described above, by making the direction of energization of the brake coil 9 opposite to the direction of energization of the excitation coil 15 as in the thirteenth embodiment. Furthermore, in the present embodiment, the rotor 22 is a rotor of the consequent-pole type, and the direction of energization of the brake coil 9 is opposite to the direction of energization of the excitation coil 15. This causes cancellation of a component of the brake magnetic flux generated by the brake coil 9, passing through the shaft 23 in the axial direction. As a result, the shaft 23 is not magnetized. Therefore, when a magnetic material such as iron is attached to an axial end portion of the shaft 23, it is possible to obtain the advantage of preventing the magnetic material from being attracted to the shaft 23.

Fourteenth Embodiment

Figure 16:
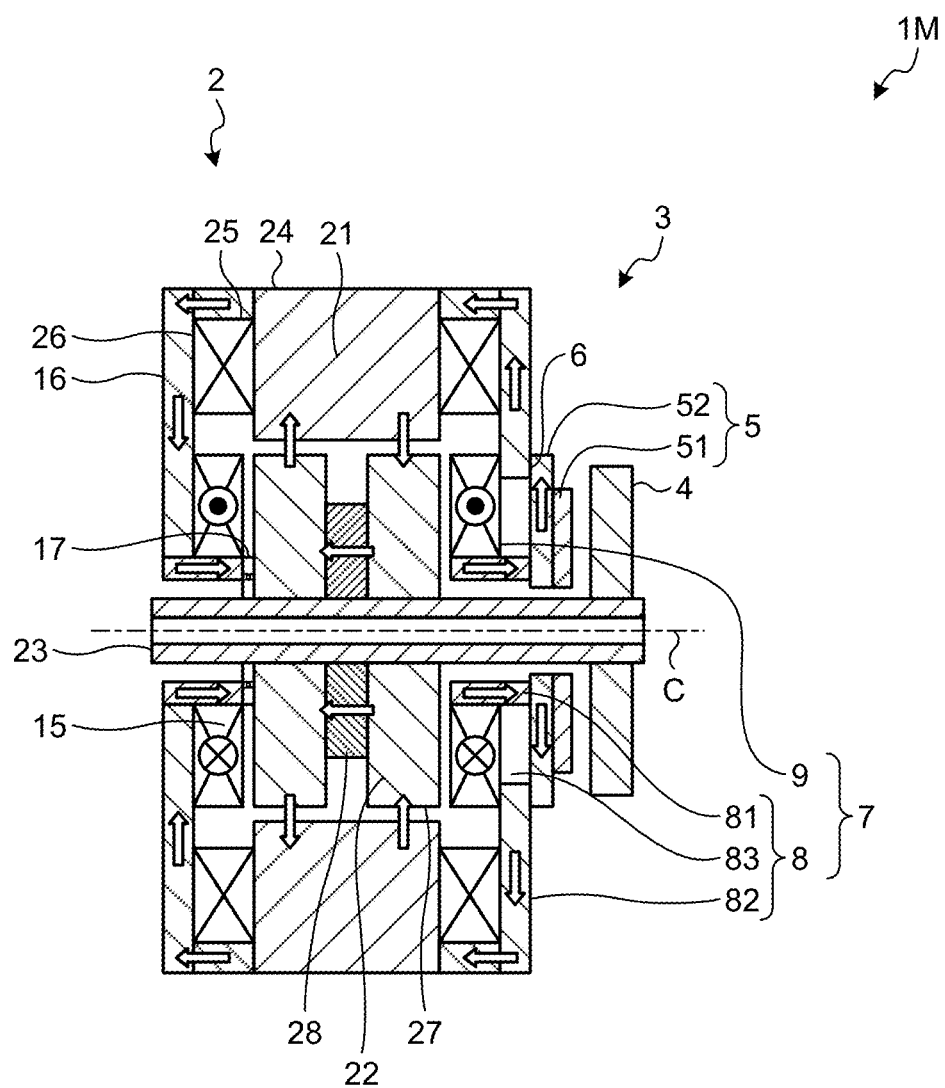
FIG. 16 is a cross-sectional view of a rotator according to a fourteenth embodiment in a state where the brake is released.

Next, a rotator 1M according to a fourteenth embodiment will be described with reference to FIG. 16. FIG. 16 is a cross-sectional view of the rotator 1M according to the fourteenth embodiment in a state where the brake is released. FIG. 16 schematically illustrates the flow of magnetic flux to be generated by the brake coil 9 when the brake is released and the flow of magnetic flux M due to a rotating magnetic field. Note that, in the fourteenth embodiment, the same reference numerals are given to overlaps between the twelfth embodiment described above and the fourteenth embodiment, and description thereof is omitted.

The motor 2 includes a bearing 17 that supports the shaft 23 such that the shaft 23 is rotatable. A direction of the flow of part of brake magnetic flux generated by energization of the brake coil 9 coincides with a direction for canceling part of the magnetic flux generated by the rotating magnetic field.

Generally, in some concentrated winding motors such as a distributed winding motor and an 8-pole 12-slot motor, when three-phase alternating current is applied to a motor coil, a magnetic field is generated in a stator in the direction of rotation of a rotator, so that a potential difference is generated in a bearing. This potential difference causes electric discharge inside the bearing. As a result, the bearing is damaged by electric corrosion. In the fourteenth embodiment, the brake coil 9 is energized such that part of the brake magnetic flux flows in the direction for canceling part of the magnetic flux due to the rotating magnetic field. As a result, it is possible to reduce the potential difference of the bearing 17, and to suppress the bearing 17 from being damaged. Such an effect can be achieved not only by the rotator 1M of a both-side brake type including the brake coil 9 and the excitation coil 15 but also by the rotator 1 of a one-side brake type including only the brake coil 9 as in the first embodiment.

Fifteenth Embodiment

Figure 17:
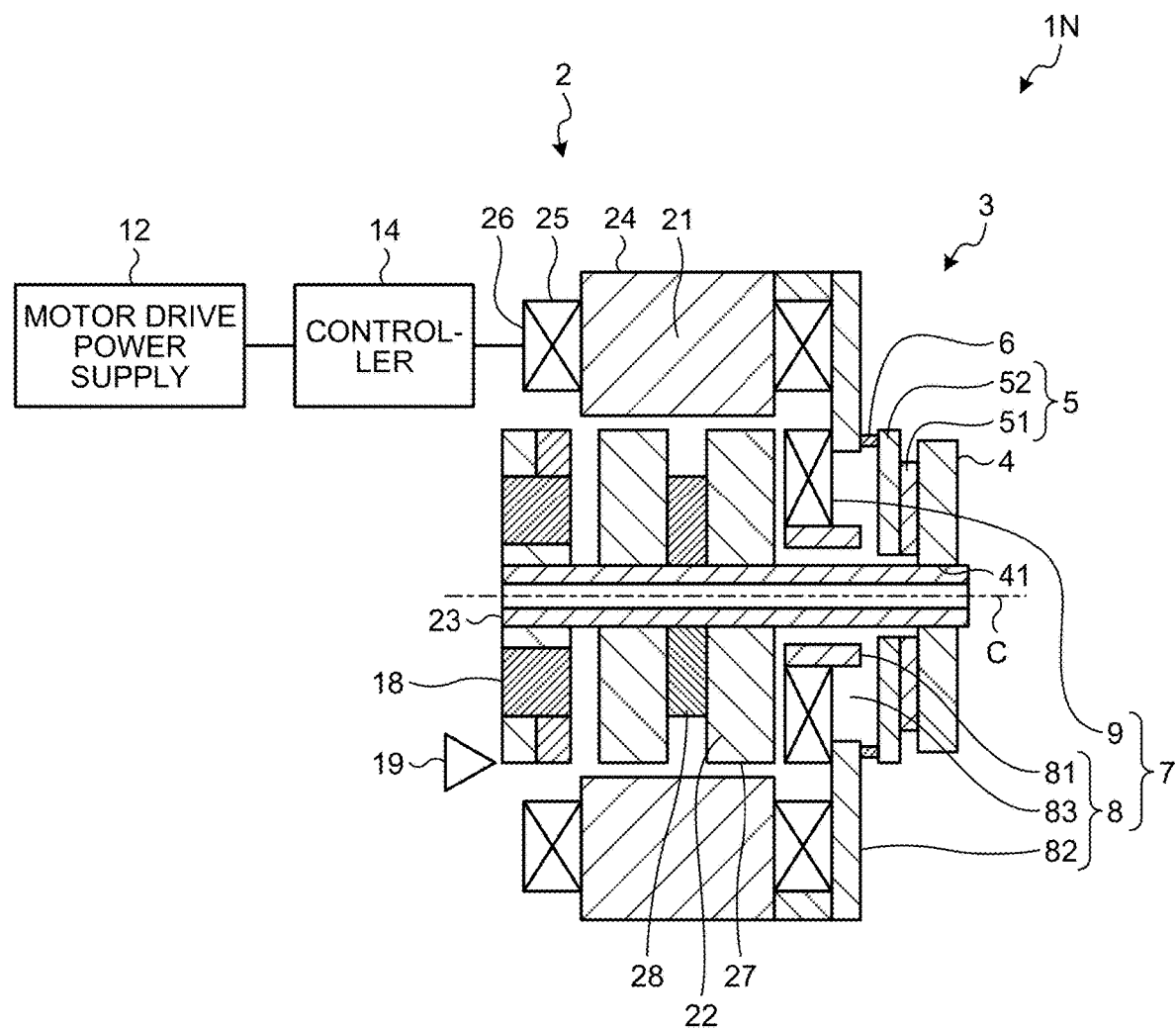
FIG. 17 is a cross-sectional view of a rotator according to a fifteenth embodiment in a state where the brake is working.

Next, a rotator 1N according to a fifteenth embodiment will be described with reference to FIG. 17. FIG. 17 is a cross-sectional view of the rotator 1N according to the fifteenth embodiment in a state where the brake is working. Note that, in the fifteenth embodiment, the same reference numerals are given to overlaps between the first embodiment described above and the fifteenth embodiment, and description thereof is omitted.

The rotator 1N includes a speed reducer 18, an angle detector 19, the controller 14, and the motor drive power supply 12. The speed reducer 18 is attached to the shaft 23. The angle detector 19 is provided on an output side of the speed reducer 18, and detects an angle of rotation of the motor 2. The controller 14 estimates the angle of rotation of the motor 2 based on a voltage being applied to the motor 2 or a current flowing through the motor 2. The motor drive power supply 12 is an external power supply that supplies power to the motor coil 25. The controller 14 is electrically connected to the motor drive power supply 12. The speed reducer 18 is disposed such that the speed reducer 18 and the brake 3 are located on opposite sides of the motor 2 in the axial direction.

In the fifteenth embodiment, it is possible to omit the angle detector from an input side of the speed reducer 18 by performing sensorless control on the input side of the speed reducer 18. As a result, the rotator 1 can be downsized. Meanwhile, it is possible to reduce the influence of backlash of the speed reducer 18 by providing the angle detector 19 on the output side of the speed reducer 18, so that the position detection accuracy of the angle detector 19 can be enhanced.

The configurations set forth in the above embodiments show examples, and it is possible to combine the configurations with another known technique or combine the embodiments with each other, and is also possible to partially omit or change the configurations without departing from the scope of the present disclosure.

REFERENCE SIGNS LIST 1, 1A, 1B, 1C, 1D, 1E, 1F, 1G, 1H, 1I, 1J, 1K, 1L, 1M, 1N rotator; 2 motor; 3 brake; 4 rotating plate; 5 slide plate;

6 spring; 7 electromagnet; 8 yoke; 9 brake coil; 10 stationary plate; 10a, 51a, 52a through-hole; 11 hub; 12 motor drive power supply; 13 brake power supply; 14 controller; 15 excitation coil; 16 excitation yoke; 17 bearing; 18 speed reducer; 19 angle detector; 21 stator; 22 rotor; 23 shaft; 24 stator core; 25 motor coil; 26 coil end portion; 27 rotor core; 27a first rotor core; 27b second rotor core; 27c, 27d, 27e protrusion; 28, 28a, 28b permanent magnet; 41 attachment hole; 51 brake plate; 52 armature; 81 inner cylinder; 82 outer cylinder; 82a outer cylinder main body; 82b flange; 83 space; 84 thin cylinder; B bolt.

The invention claimed is:

1. A rotator comprising:
a motor including:
a stator having a cylindrical shape;
a rotor provided on an inner peripheral side of the stator such that there is a gap between the rotor and the stator; and
a shaft provided in such a way as to penetrate the rotor; and
a brake adapted to brake the motor, wherein
the brake includes:
a rotating plate adapted to rotate with rotation of the shaft, the rotating plate being fixed on an outer peripheral surface of the shaft;
a slide plate provided such that the slide plate can be slid in an axial direction of an axis of rotation of the motor in such a way as to approach and move away from the rotating plate;
a spring adapted to bias the slide plate toward the rotating plate by spring force; and
an electromagnet disposed such that the electromagnet and the slide plate are located on opposite sides of the spring in the axial direction, the electromagnet being capable of attracting the slide plate in a direction away from the rotating plate against the spring force of the spring,
the electromagnet includes:
a yoke including an inner cylinder and an outer cylinder, the inner cylinder having a cylindrical shape, the shaft being passed through the inner cylinder, the outer cylinder having a cylindrical shape, the outer cylinder being disposed on an outer peripheral side of the inner cylinder such that there is a space between the inner cylinder and the outer cylinder; and
a brake coil disposed in the space formed between the inner cylinder and the outer cylinder, wherein
the yoke is disposed between the slide plate and the rotor in the axial direction such that there is a gap between the yoke and each of the slide plate and the rotor,
the brake coil is disposed adjacent to the rotor in the axial direction, and
when the brake coil is energized,
the slide plate is adapted to approach both the inner cylinder and the outer cylinder, and
brake magnetic flux is generated and the brake magnetic flux flows to a rotor core, wherein
the rotor core is disposed such that there is a gap between the inner cylinder and the rotor core.

2. The rotator according to claim 1, wherein
the yoke includes a thin cylinder that connects the inner cylinder and the outer cylinder, the thin cylinder being smaller in thickness than the inner cylinder and the outer cylinder.

3. The rotator according to claim 1, wherein
the brake coil and the rotor are equal in outer diameter, and
the outer cylinder and the stator are equal in outer diameter.

4. The rotator according to claim 1, wherein when:
a first gap is defined as an axial gap formed between the inner cylinder and the rotor;
a second gap is defined as a gap formed between the rotor and the stator in a radial direction;
a third gap is defined as an axial gap formed between the outer cylinder and the slide plate; and
a fourth gap is defined as an axial gap formed between the inner cylinder and the slide plate, following relationships are satisfied in a state where the brake coil is energized:

second gap>first gap>third gap≥0 mm; and second gap>first gap>fourth gap≥0 mm.

5. The rotator according to claim 1, comprising:
a controller in which a control circuit of the motor and a control circuit of the brake coil are integrated, wherein
the controller is adapted to optimally distribute current to the motor coil and the brake coil to increase an efficiency of the rotator.

6. The rotator according to claim 1, comprising:
an excitation coil disposed such that the excitation coil and the brake coil are located on opposite sides of the motor in the axial direction.

7. The rotator according to claim 6, wherein
the rotor is of a claw-pole type or a mixed type of the claw-pole type and a consequent-pole type, and includes a permanent magnet, and
a direction of energization of the brake coil is identical to a direction of energization of the excitation coil.

8. The rotator according to claim 6, wherein
the rotor is of a consequent-pole type, and includes a permanent magnet, and
a direction of energization of the brake coil is opposite to a direction of energization of the excitation coil.

9. The rotator according to claim 1, further comprising:
a speed reducer attached to the shaft;
an angle detector provided on an output side of the speed reducer and adapted to detect an angle of rotation of the motor; and
a control circuit adapted to estimate the angle of rotation of the motor based on a voltage being applied to the motor or a current flowing through the motor, wherein
the speed reducer is disposed such that the speed reducer and the brake are located on opposite sides of the motor in the axial direction.

10. The rotator according to claim 1, wherein
a portion of the space and the spring do not overlap in the axial direction.

11. A rotator comprising:
a motor including:
a stator having a cylindrical shape;
a rotor provided on an inner peripheral side of the stator such that there is a gap between the rotor and the stator; and
a shaft provided in such a way as to penetrate the rotor; and
a brake adapted to brake the motor, wherein
the brake includes:
a rotating plate adapted to rotate with rotation of the shaft, the rotating plate being fixed on an outer peripheral surface of the shaft;

a slide plate provided such that the slide plate can be slid in an axial direction of an axis of rotation of the motor in such a way as to approach and move away from the rotating plate;
a spring adapted to bias the slide plate toward the rotating plate by spring force; and
an electromagnet disposed such that the electromagnet and the slide plate are located on opposite sides of the spring in the axial direction, the electromagnet being capable of attracting the slide plate in a direction away from the rotating plate against the spring force of the spring,
the electromagnet includes:
a yoke including an inner cylinder and an outer cylinder, the inner cylinder having a cylindrical shape, the shaft being passed through the inner cylinder, the outer cylinder having a cylindrical shape, the outer cylinder being disposed on an outer peripheral side of the inner cylinder such that there is a space between the inner cylinder and the outer cylinder; and
a brake coil disposed in the space formed between the inner cylinder and the outer cylinder, wherein
the yoke is disposed between the slide plate and the rotor in the axial direction such that there is a gap between the yoke and each of the slide plate and the rotor,
the brake coil is disposed adjacent to the rotor in the axial direction,
the yoke includes a thin cylinder that connects the inner cylinder and the outer cylinder, the thin cylinder being smaller in thickness than the inner cylinder and the outer cylinder, and
when the brake coil is energized, the slide plate is adapted to approach both the inner cylinder and the outer cylinder.

12. The rotator according to claim 11, wherein when:
a first gap is defined as an axial gap formed between the inner cylinder and the rotor;
a second gap is defined as a gap formed between the rotor and the stator in a radial direction;
a third gap is defined as an axial gap formed between the outer cylinder and the slide plate; and
a fourth gap is defined as an axial gap formed between the inner cylinder and the slide plate, following relationships are satisfied in a state where the brake coil is energized:

second gap>first gap>third gap≥0 mm; and second gap>first gap>fourth gap≥0 mm.

13. The rotator according to claim 11, comprising:
a controller in which a control circuit of the motor and a control circuit of the brake coil are integrated.

14. The rotator according to claim 11, comprising:
an excitation coil disposed such that the excitation coil and the brake coil are located on opposite sides of the motor in the axial direction.

15. The rotator according to claim 11, further comprising:
a speed reducer attached to the shaft;
an angle detector provided on an output side of the speed reducer and adapted to detect an angle of rotation of the motor; and
a control circuit adapted to estimate the angle of rotation of the motor based on a voltage being applied to the motor or a current flowing through the motor, wherein
the speed reducer is disposed such that the speed reducer and the brake are located on opposite sides of the motor in the axial direction.

16. A rotator comprising:
a motor including:
a stator having a cylindrical shape;
a rotor provided on an inner peripheral side of the stator such that there is a gap between the rotor and the stator; and
a shaft provided in such a way as to penetrate the rotor; and
a brake adapted to brake the motor, wherein
the brake includes:
a rotating plate adapted to rotate with rotation of the shaft, the rotating plate being fixed on an outer peripheral surface of the shaft;
a slide plate provided such that the slide plate can be slid in an axial direction of an axis of rotation of the motor in such a way as to approach and move away from the rotating plate;
a spring adapted to bias the slide plate toward the rotating plate by spring force; and
an electromagnet disposed such that the electromagnet and the slide plate are located on opposite sides of the spring in the axial direction, the electromagnet being capable of attracting the slide plate in a direction away from the rotating plate against the spring force of the spring,
the electromagnet includes:
a yoke including an inner cylinder and an outer cylinder, the inner cylinder having a cylindrical shape, the shaft being passed through the inner cylinder, the outer cylinder having a cylindrical shape, the outer cylinder being disposed on an outer peripheral side of the inner cylinder such that there is a space between the inner cylinder and the outer cylinder; and
a brake coil disposed in the space formed between the inner cylinder and the outer cylinder, wherein
the yoke is disposed between the slide plate and the rotor in the axial direction such that there is a gap between the yoke and each of the slide plate and the rotor,
the brake coil is disposed adjacent to the rotor in the axial direction,
the brake coil and the rotor are equal in outer diameter,
the outer cylinder and the stator are equal in outer diameter, and
when the brake coil is energized, the slide plate is adapted to approach both the inner cylinder and the outer cylinder.

17. The rotator according to claim 16, wherein when:
a first gap is defined as an axial gap formed between the inner cylinder and the rotor;
a second gap is defined as a gap formed between the rotor and the stator in a radial direction;
a third gap is defined as an axial gap formed between the outer cylinder and the slide plate; and
a fourth gap is defined as an axial gap formed between the inner cylinder and the slide plate, following relationships are satisfied in a state where the brake coil is energized:

second gap>first gap>third gap≥0 mm, and second gap>first gap>fourth gap≥0 mm.

18. The rotator according to claim 16, comprising:
a controller in which a control circuit of the motor and a control circuit of the brake coil are integrated.

19. The rotator according to claim 16, comprising:
an excitation coil disposed such that the excitation coil and the brake coil are located on opposite sides of the motor in the axial direction.

20. The rotator according to claim 16, further comprising:
a speed reducer attached to the shaft;
an angle detector provided on an output side of the speed reducer and adapted to detect an angle of rotation of the motor; and
a control circuit adapted to estimate the angle of rotation of the motor based on a voltage being applied to the motor or a current flowing through the motor, wherein
the speed reducer is disposed such that the speed reducer and the brake are located on opposite sides of the motor in the axial direction.

* * * * *